(12) United States Patent
Allgaeuer et al.

(10) Patent No.: US 11,433,735 B2
(45) Date of Patent: Sep. 6, 2022

(54) CONTROL SYSTEM FOR A HEATING SYSTEM AND METHOD FOR OPERATING A HEATING SYSTEM

(71) Applicant: Bayerische Motoren Werke Aktiengesellschaft, Munich (DE)

(72) Inventors: Christian Allgaeuer, Munich (DE); Paul Christ, Munich (DE); Oliver Horn, Munich (DE); Dominik Moser, Linz (AT); Patrick Oswald, Munich (DE); Andreas Siuka, Kematen an der Krems (AT)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 268 days.

(21) Appl. No.: 16/823,495

(22) Filed: Mar. 19, 2020

(65) Prior Publication Data
US 2020/0298657 A1 Sep. 24, 2020

(30) Foreign Application Priority Data
Mar. 20, 2019 (DE) ...................... 10 2019 107 194.1

(51) Int. Cl.
*B60H 1/00* (2006.01)
*B60H 1/22* (2006.01)
*B60H 1/32* (2006.01)

(52) U.S. Cl.
CPC ..... *B60H 1/00735* (2013.01); *B60H 1/00007* (2013.01); *B60H 1/00278* (2013.01);
(Continued)

(58) Field of Classification Search
CPC ............ B60H 1/00735; B60H 1/00007; B60H 1/00278; B60H 1/00385; B60H 1/00428;
(Continued)

(56) References Cited

U.S. PATENT DOCUMENTS 10,654,336 B2 * 5/2020 Allgaeuer .............. B60H 1/323
10,773,586 B2 * 9/2020 Lucke ................. H01M 10/625
(Continued)

FOREIGN PATENT DOCUMENTS

DE 10 2015 220 623 A1 4/2017

*Primary Examiner* — Ljiljana V. Cinc
(74) *Attorney, Agent, or Firm* — Crowell & Moring LLP

(57) ABSTRACT

A control system and method for a heating system of an electric vehicle or hybrid vehicle is embodied such that when there is a heating request for a high-voltage accumulator, an HVA heating mode is activated in which the high-voltage accumulator which is connected to an HVA circuit of the heating system is heated by an HVA heating source which is activated for this purpose so that heat is generated in the HVA circuit or transferred into the circuit. When there is a heating request for a passenger compartment of the vehicle, an air-conditioning heating mode is activated in which the passenger compartment is heated by a heating circuit, with heat which is generated in the heating circuit with an auxiliary heater or is transferred into the heating circuit with a heat pump, or both. When the air-conditioning heating mode is activated, it is determined whether or not there is a heating deficit which indicates whether the heating request can be completely satisfied with the auxiliary heater or with the heat pump or with both. If there is a heating deficit, an auxiliary heating mode is activated in which heat
(Continued)

of the HVA heating source is transferred from the HVA circuit into the heating circuit by the heat pump in order to compensate the heating deficit.

16 Claims, 2 Drawing Sheets

(52) U.S. Cl.
CPC ..... *B60H 1/00385* (2013.01); *B60H 1/00428* (2013.01); *B60H 1/00899* (2013.01); *B60H 1/00907* (2013.01); *B60H 1/22* (2013.01); *B60H 1/32284* (2019.05); *B60H 2001/00307* (2013.01); *B60H 2001/00928* (2013.01); *B60H 2001/00949* (2013.01)

(58) Field of Classification Search
CPC .. B60H 1/00899; B60H 1/00907; B60H 1/22; B60H 1/32284; B60H 2001/00307; B60H 2001/00928; B60H 2001/00949; B60H 1/02; H01M 10/625; H01M 10/663; Y02E 60/10; Y02T 10/70
See application file for complete search history.

(56) References Cited

U.S. PATENT DOCUMENTS

| | | | | |
|---|---|---|---|---|
| 10,814,692 | B2 * | 10/2020 | Kim | B60H 1/32284 |
| 10,889,157 | B2 * | 1/2021 | Kim | B60H 1/00278 |
| 10,987,998 | B2 * | 4/2021 | Kim | B60H 1/00885 |
| 11,065,936 | B2 * | 7/2021 | Gonze | B60H 1/00899 |
| 11,207,949 | B2 * | 12/2021 | He | B60H 1/323 |
| 11,318,813 | B2 * | 5/2022 | Allgaeuer | B60H 1/00885 |
| 2012/0174602 | A1 * | 7/2012 | Olivier | F25B 25/005 |
| | | | | 62/238.1 |
| 2016/0107503 | A1 * | 4/2016 | Johnston | B60H 1/00278 |
| | | | | 165/202 |
| 2016/0107505 | A1 * | 4/2016 | Johnston | B60H 1/00278 |
| | | | | 165/202 |
| 2018/0162193 | A1 * | 6/2018 | Horn | B60H 1/3213 |
| 2018/0236842 | A1 | 8/2018 | Allgaeuer et al. | |
| 2018/0319246 | A1 * | 11/2018 | Allgaeuer | H01M 10/6568 |
| 2019/0291540 | A1 * | 9/2019 | Gutowski | B60H 1/32284 |
| 2020/0298657 | A1 * | 9/2020 | Allgaeuer | B60H 1/00899 |
| 2020/0298662 | A1 * | 9/2020 | Herbolzheimer | B60H 1/00899 |

* cited by examiner

CONTROL SYSTEM FOR A HEATING SYSTEM AND METHOD FOR OPERATING A HEATING SYSTEM

CROSS REFERENCE TO RELATED APPLICATION

This application claims priority under 35 U.S.C. § 119 from German Patent Application No. 10 2019 107 194.1, filed Mar. 20, 2019, the entire disclosure of which is herein expressly incorporated by reference.

BACKGROUND AND SUMMARY OF THE INVENTION

The invention relates to a control system for a heating system of an electric vehicle or hybrid vehicle and to a method for operating such a heating system by way of such a control system.

A heating system usually serves to control the temperature of the various components which are connected to the heating system for this purpose. Specifically in an electric vehicle or hybrid vehicle, such components are a passenger compartment and a high-voltage accumulator of the vehicle. The heating system can usually be operated in various operating states in order to satisfy the respective temperature-control requests of the individual components.

DE 10 2015 220 623 A1 describes a heating system with a heat pump mode in which waste heat can be transferred with a heat pump to a heating-type heat exchanger in a heating circuit and can be used there to heat a passenger compartment. In this context, various possibilities are available for supplying the heating-type heat exchanger with heat: firstly if the high-voltage accumulator (HVA) is cooled in an HVA cooling mode, its heat is used for heating. Secondly if a heat source in the cooling circuit is to be cooled, its heat is used in an analogous fashion. And thirdly: a classic take up of heat from the surroundings via a surroundings cooler. In each of these three cases, the heat pump is used. Furthermore, an auxiliary heater is described in the heating circuit, which auxiliary heater compensates a heating deficit in the heating circuit if the supply of heat by the heat pump mode is insufficient.

However, it is also problematic that the heat which passes into the heating circuit is, under certain circumstances, not sufficient to sufficiently satisfy a given heating request for the passenger compartment so that a heating deficit arises which brings about corresponding decreases in comfort or deficiencies in defrosting of windows. Correspondingly it is necessary to avoid such a heating deficit through improved actuation of the heating system.

Against this background, an object of the invention is to disclose an improved control system for a heating system. Furthermore, an improved method for operating a heating system is to be disclosed. Overall, a passenger compartment heating system which is as efficient as possible and as appropriate for demand as possible is to be ensured, with which heating system a heating deficit is reduced as far as possible, or even entirely avoided, by suitable activation of the heating system.

The object is achieved by a control system for a heating system and by a method of operating the heating system via the control system, in accordance with the claimed invention.

The control system serves to control a heating system of an electric vehicle or hybrid vehicle which is only referred to below as "vehicle" for the sake of brevity. The vehicle has a high-voltage accumulator (HVA) which is cooled by coolant. The high-voltage accumulator is connected to an HVA circuit and is heated in an HVA heating mode. For this purpose, the control system is embodied in such a way that when there is a heating request for the high-voltage accumulator the HVA heating mode is activated in which the high-voltage accumulator is heated by means of an HVA heating source which is activated for this purpose so that heat is generated in the HVA circuit or is transmitted into said circuit. The HVA heating source is either connected directly to the HVA circuit or is connected to a cooling circuit of the heating system, which circuit is then connected to the HVA circuit by means of suitable actuators in such a way that an extended HVA circuit is formed in which the HVA heating source is arranged upstream of the high-voltage accumulator in order to heat it. Furthermore, when there is a heating request for a passenger compartment of the vehicle, an air-conditioning heating mode in which the passenger compartment is heated with heat by means of a heating circuit is correspondingly activated. This heat is generated with an auxiliary heater in the heating circuit or is transferred into the heating circuit with a heat pump, or both. If the heat pump is used, it extracts heat from the surroundings via a surroundings cooler in the cooling circuit or transfers waste heat into the heating circuit from a vehicle component which is connected to the cooling circuit.

However, in the air-conditioning heating mode the heat of the auxiliary heater and of the heat pump is under certain circumstances not sufficient. Therefore, when the air-conditioning heating mode is activated it is determined whether there is a heating deficit which indicates whether or not the heating request can be satisfied completely with the auxiliary heater or with the heat pump, or with both. In other words: it is checked whether the heat which can be provided either with the auxiliary heater or with the heat pump or with the two in combination is sufficient to satisfy the heating request. If the auxiliary heater or the heat pump is sufficient alone or they are sufficient in combination it is determined that there is no heating deficit. If, conversely, the auxiliary heater and the heat pump are not sufficient, it is determined that there is a heating deficit. If there is actually a heating deficit, an auxiliary heating mode is activated in which firstly the HVA heating source is activated insofar as it is not already active in any case owing to the HVA heating mode. Furthermore, in the auxiliary heating mode heat from the HVA heating source is transferred from the HVA circuit into the heating circuit by means of the heat pump in order to compensate the heating deficit. In summary, an HVA heating source is therefore used for the high-voltage accumulator in the auxiliary heating mode in order to compensate a heating deficit for the passenger compartment. In this respect, an advantageous second use is implemented for the HVA heating source.

The invention is firstly based on the observation that in order to heat the passenger compartment it is not sufficient in certain cases to make available a large amount of heat, that is to say there is a heating deficit. Specifically, as described with respect to the heating of the passenger compartment, on the one hand the heat pump is available and on the other the auxiliary heater. The heating deficit then arises from the fact that the heat sources used in this context are not sufficient in certain cases. For example, at extremely low external temperatures of e.g. below −10° C., the surroundings for the heat pump do not constitute a sufficient heat source under certain circumstances. Waste heat from vehicle components is also not necessarily available. Depending on the magnitude of the heating request, the auxiliary heater is possibly not sufficiently dimensioned to generate the required quantity of heat specifically in the case of low external temperatures. This is the case, for example, if rapid heating is desired or the passenger compartment to be heated is very large, such as e.g. mid-range and top range vehicles. One particular advantage of the use of the HVA heating source is then that the auxiliary heater in the heating circuit does not have to be configured for special cases with a high heating request but rather is given dimensions which are smaller and sufficient e.g. only for standard cases. This already results in corresponding advantages in terms of cost and installation space. For example, the auxiliary heater has a heating capacity in the range from 4 kW to 5 kW, but can also be dimensioned differently in accordance with a specific configuration of the vehicle and of the heating system.

A significant advantage of the invention is in particular the fact that the heating deficit is compensated by using the HVA heating source in addition to the auxiliary heater and advantageously adding to the limited heating capacity thereof. There is in particular no take up of heat from the surroundings in the auxiliary heating mode because the heat pump is now used to transfer heat from the HVA circuit into the heating circuit.

In DE 10 2015 220 623 A1 mentioned at the beginning, although the case is described in which waste heat of the high-voltage accumulator which is to be discharged in an HVA cooling mode is used to heat the passenger compartment, this requires that the high-voltage accumulator also actually generates heat which can be, and is to be, discharged, that is to say that the HVA cooling mode is active. This is not necessary in the present auxiliary heating mode, and is, in particular, also not the case since the HVA heating source is used. As a result, an additional heating potential is acquired. Overall, the passenger compartment heating system which is particularly efficient and appropriate for demand is obtained. In contrast, the waste heat of the high-voltage accumulator is used in particular within the scope of the air-conditioning heating mode if the heat pump transfers waste heat from a vehicle component, here this is then the high-voltage accumulator, into the heating circuit.

In the auxiliary heating mode, heat is in particular generated in the same way and with the same component as in the HVA heating mode, the heat is merely supplied to a different use. The auxiliary heating mode therefore basically corresponds to the HVA heating mode, with the difference that it is not the high-voltage accumulator which is heated but rather the passenger compartment. The auxiliary heating mode and the HVA heating mode can therefore also be activated simultaneously and are also activated simultaneously depending on demand, so that the heat in the HVA circuit is then used partially to heat the high-voltage accumulator and partially to heat the passenger compartment.

It is basically possible to determine, in different ways, whether there is a heating deficit. In a suitable refinement, the control system is embodied for this purpose in such a way that it is determined that there is a heating deficit if a difference between a heating circuit actual temperature in the heating circuit and a heating circuit set point temperature exceeds a maximum difference. The heating deficit corresponds either to the described difference or is derived therefrom. Insofar as the heating circuit actual temperature is lower than the heating circuit set point temperature and the difference is therefore negative, it is also necessary to apply heat to heat the passenger compartment. The difference between the heating circuit actual temperature and the heating circuit set point temperature is also referred to as a control error in the heating circuit and is preferably used.

In an alternative which is also suitable, the control system is embodied in such a way that it is determined that there is a heating deficit if a difference between a set point heating capacity and a heating capacity potential exceeds a maximum difference, wherein the set point heating capacity is determined on the basis of the heating request, and the potential heating capacity is determined on the basis of a respective maximum heating capacity of the auxiliary heater and of the heat pump. Therefore, instead of only considering the current temperature situation in the heating circuit, in this refinement it is calculated whether the heating capacity which the auxiliary heater and the heat pump can apply at maximum corresponds to the set point heating capacity which is required to satisfy the heating request. In particular the external temperature, the temperature of the coolant in the cooling circuit and, if appropriate, the waste heat of vehicle components are taken into account for the heating capacity of the heat pump. The set point heating capacity is determined, in particular, on the basis of current conditions such as e.g. air volume, volume flow, temperature of the air and/or temperature of the coolant at the heating-type heat exchanger.

Both variants for determining the heating deficit can basically also be combined with one another and are then used in parallel with one another.

A difference between the heating circuit actual temperature and the heating circuit set point temperature or between the set point heating capacity and the potential heating capacity does not per se necessarily signify that the auxiliary heater and the heat pump are not sufficient to satisfy the heating request. Therefore, in one preferred refinement the control system is embodied in such a way that the auxiliary heating mode is activated in a delayed fashion in that when there is a heating deficit the auxiliary heating mode is not activated until a waiting time has elapsed. This ensures that the maximum difference is not exceeded only temporarily but also is still present after the waiting time and therefore further heat is actually required permanently. In particular, it is also advantageous to monitor the temporal development of the difference and to determine a heat deficit only when the difference does not reduce or does not reduce with a certain minimum speed. As a result, the auxiliary heater and the heat pump are provided with the possibility of firstly reducing the difference during the waiting time, and activating the auxiliary heating mode only if this does not succeed and the heating capacity from the auxiliary heater and the heating capacity of the auxiliary and heat pump is actually insufficient. Furthermore, the waiting time prevents the auxiliary heating mode being activated immediately only at the start of a large heating request, e.g. if a user has inadvertently set a high set point heating circuit temperature for the passenger compartment. Instead, a period of time is allowed to elapse to determine whether the heating deficit actually occurs permanently. The statements with respect to the waiting time also apply analogously to the inverse case of the deactivation of the auxiliary heating mode.

The heat pump is suitably actuated in accordance with the request by the control system and for this purpose is preferably closed-loop control in order to satisfy as well as possible, if appropriate in combination with the auxiliary heater, a heating request for the passenger compartment or the high-voltage accumulator or for both, in accordance with the magnitude of the heating request and in accordance with the heat which is available.

The heat pump is part of a refrigeration circuit of the heating system and has a chiller and a condenser which are both connected to the refrigeration circuit. On the coolant side, the chiller is connected to the HVA circuit and the condenser is connected to the heating circuit. The refrigeration circuit has a compressor which is operated at a certain compressor rotational speed which can be adjusted and is set by the control system in order to set a specific heating capacity and refrigeration capacity of the refrigeration circuit. The heating capacity of the refrigeration circuit, to be more precise of the heat pump, i.e. the quantity of heat which is transferred from the heat pump into the heating circuit, is dependent on the electrical drive power of the compressor and on the refrigeration capacity of the refrigeration circuit, to be more precise of the chiller, that is to say the extraction of heat from the HVA circuit by the chiller.

Furthermore, the refrigeration circuit has an air-conditioning evaporator for cooling the passenger compartment in an air-conditioning cooling mode. An expansion valve which is opened in order to activate the evaporator and closed in order to deactivate the evaporator is arranged upstream of the air-conditioning evaporator and the chiller, respectively. The air-conditioning evaporator is deactivated in the air-conditioning heating mode. The term "expansion valve" is understood below to be the expansion valve upstream of the chiller unless stated otherwise. The expansion valve is operated with a certain opening which is adjustable and is set by the control system in order to set a certain overheating value of the refrigerant and therefore to set the refrigeration capacity of the chiller.

Ultimately, the compressor rotational speed, which is preferably set by means of the control error in the heating circuit, is used to set the refrigerant mass flow and therefore also the refrigeration capacity at the chiller, which refrigeration capacity is therefore additionally influenced by means of the opening of the expansion valve. By closing the expansion valve, the refrigerant mass flow is reduced, and as a result the refrigeration capacity is decreased, resulting in a higher overheating value of the refrigerant downstream of the chiller. When the expansion valve opens, the refrigeration mass flow conversely increases, as a result of which the refrigeration capacity increases, and therefore the overheating value of the refrigerant reduces. In other words, by means of the opening of the expansion valve it is possible to reduce again, and therefore additionally adjust, the refrigeration capacity at the chiller which was set by means of the compressor rotational speed of the compressor. The compressor then has to be actuated to a greater extent so that the desired refrigeration capacity is reached again. As a result, the capacitor requires a higher drive power.

Since the heating capacity of the heat pump is then the sum of the drive capacity of the compressor and of the refrigeration capacity at the chiller, in one preferred refinement in this way the efficiency of the heat pump is manipulated in the auxiliary heating mode by means of the expansion valve in such a way that the necessary heating capacity for auxiliary heating is provided with the smallest possible and at the same time most limited possible extraction of heat from the HVA circuit. This is specifically advantageous if at the same time as the auxiliary heating mode the HVA heating mode is also active, said HVA heating mode requesting a certain amount of heat in the HVA circuit and therefore limiting the possible extraction of heat by the chiller. In one particularly preferred refinement, the heat pump is actuated in such a way that its efficiency is set in such a way that the extraction of heat from the HVA circuit is limited and the heating deficit is nevertheless compensated. In other words, when the auxiliary heating mode and the HVA heating mode are activated simultaneously, the compressor and the expansion valve are actuated in a coordinated fashion with one another in such a way that the heat which is extracted from the HVA circuit via the heat pump and is transferred into the heating circuit compensates the heating deficit in conjunction with the drive power of the compressor, and nevertheless is limited in this context so that the high-voltage accumulator is still heated sufficiently. The degree of efficiency of the heat pump results, in particular, from the ratio of the drive power of the compressor to the heating capacity and is therefore also dependent on the refrigeration capacity of the chiller owing to the principle involved. The degree of efficiency can be adjusted, in particular automatically, by means of the compressor rotational speed and the opening of the expansion valve. As a result of the degree of efficiency being set, the composition of the refrigeration capacity and drive power is therefore set for a specific heating capacity, i.e. the ratio of the extraction of heat from the HVA circuit to the electrical power for the compressor is set. As a result, the extraction of heat by the chiller, that is to say its refrigeration capacity, is limited to the heat which is available in the HVA circuit and is supplemented with additional drive power of the compressor in order to reach a specific heating capacity. The heat which is available in the HVA circuit is determined by the total amount of heat present in the HVA circuit and that component thereof which is required to heat the high-voltage accumulator. The available heat is determined, in particular, on the basis of the coolant actual temperature downstream of the chiller and upstream of the high-voltage accumulator. The heating capacity is determined by the heating deficit which is to be compensated.

When the auxiliary heating mode is activated, the air-conditioning heating mode is always also active owing to the principle involved. If the auxiliary heating mode is active—if the heat pump is active—the expansion valve and the compressor are preferably actuated precisely according to the same control logic as in the air-conditioning heating mode without the additional auxiliary heating mode.

The control system is preferably embodied in such a way that the capacity of the refrigeration circuit of the heating system is closed-loop controlled with a compressor closed-loop controller which uses as a manipulated variable the compressor rotational speed of the compressor in the refrigeration circuit and to which the heating circuit actual temperature of the coolant in the heating circuit is fed as a closed-loop control variable and the heating circuit set point temperature is fed as a guide variable. In this context, the compressor closed-loop controller is used irrespective of whether or not the auxiliary heating mode is activated in the air-conditioning heating mode. The greater the difference between the heating circuit actual temperature and heating circuit set point temperature, the higher the setting of the compressor rotational speed and the greater the heating capacity which is generated by the refrigeration circuit overall. In the air-conditioning heating mode, the objective of the compressor closed-loop controller overall is to satisfy the heating request and to make the heating circuit actual temperature approach the heating circuit set point temperature.

Insofar as the HVA heating mode is also active at the same time as the auxiliary heating mode, the heat pump and the high-voltage accumulator are in competition with respect to the heat in the HVA circuit. In particular, the chiller in the HVA circuit is arranged upstream of the high-voltage accumulator and downstream of the HVA heating source and therefore extracts heat from the HVA circuit before it arrives at the high-voltage accumulator so that under certain circumstances said accumulator is not sufficiently heated.

Therefore, in one preferred refinement the control system is embodied in such a way that the compressor closed-loop controller is limited in the auxiliary heating mode in such a way that the refrigeration capacity of the chiller in the HVA circuit is limited. For this purpose, the compressor closed-loop controller, to be more precise the compressor rotational speed, is limited in accordance with the coolant actual temperature in the HVA circuit downstream of the chiller. The capacity of the heat pump is therefore closed-loop controlled in such a way that the extraction of heat by the heat pump is restricted and therefore sufficient heat still remains for heating the high-voltage accumulator.

When the air-conditioning heating mode is active, insofar as the heat pump is active its capacity is preferably influenced by the expansion valve being closed-loop controlled to overheating of the refrigerant. In one expedient refinement, for this purpose the control system is embodied in such a way that the expansion valve is closed-loop controlled with a valve closed-loop controller which uses as a manipulated variable the opening of the expansion valve upstream of the chiller and to which an actual overheating value in the refrigeration circuit is fed as a closed-loop control variable and a set point overheating value is fed as a guide variable. In this context, the valve closed-loop controller is used irrespective of whether or not the auxiliary heating mode is activated in the air-conditioning heating mode. When the auxiliary heating mode is activated, the set point overheating value influences the quantity of heat which is extracted from the HVA circuit for heating the passenger compartment. The relationship is such here that with a relatively low set point overheating value the expansion valve is opened to a lesser extent and as a result more heat is transferred from the heat pump into the heating circuit. As the heating deficit becomes larger, a lower set point overheating value is accordingly selected.

In a way which is analogous to the compressor closed-loop controller, the valve closed-loop controller is expediently also limited in order to limit the extraction of heat from the HVA circuit and artificially degrade the efficiency in the auxiliary heating mode so that as much drive power as possible arises for the compressor, which power is ultimately also used to heat the passenger compartment by means of the heat pump, specifically when the HVA heating mode is active at the same time. Two variants, which can basically also be combined with one another, are described for this below. In one suitable variant, the control system is embodied in such a way that the capacity of the heat pump, i.e. in particular the refrigeration capacity of the chiller here, is limited in the auxiliary heating mode by virtue of the fact that the set point overheating value is obtained from a characteristic diagram in accordance with a coolant actual temperature in the HVA circuit downstream of the chiller. In another suitable variant, the control system is embodied in such a way that the capacity of the heat pump, i.e. here, in particular, the refrigeration capacity of the chiller, is limited in the auxiliary heating mode by reducing the opening of the expansion valve as the refrigeration actual temperature in the HVA circuit rises downstream of the chiller. As a result, in any case it is ensured, in particular, that the high-voltage accumulator continues to be sufficiently heated despite the extraction of heat at the chiller.

Limiting the extraction of heat during the closed-loop control of the expansion valve or of the compressor or of both is alternatively predefined by an HVA control unit of the high-voltage accumulator in that a manipulated variable or the refrigeration capacity of the chiller is transferred as a closed-loop control variable from said control unit to a control unit which controls the compressor and the expansion valve. The HVA control unit is here, in particular, part of the control system.

When the HVA heating mode is deactivated, the heat pump or the auxiliary heater or both are activated for the air-conditioning heating mode, preferably in accordance with the particular case. If specifically in a first case the heating request for the passenger compartment can be satisfied completely from the surroundings by means of the heat pump or by means of waste heat from components in the cooling circuit, only the heat pump is activated, and it then extracts corresponding heat from the surroundings or waste heat from other components in the cooling circuit in order to heat the passenger compartment. In this context, the closed-loop controllers which have already been described for the compressor and expansion valve are expediently also used, but, in particular, without the described limitations so that maximum efficiency is achieved. Whether the heat pump is sufficient alone is determined, for example, on the basis of the external temperature or a coolant temperature in the cooling circuit and the heating request. If, on the other hand, in a second case the heating request for the passenger compartment cannot be completely satisfied from the surroundings by means of the heat pump, the auxiliary heater is preferably activated in order to generate heat for heating the passenger compartment, and the heat pump is additionally activated only when the heating capacity of the auxiliary heater is not sufficient. In this context, the compressor and expansion valve are also closed-loop controlled, in particular, as already described. Overall, the auxiliary heater is prioritized, which is more efficient in terms of its result than reverse prioritization in which a power deficit of the heat pump would be compensated with the auxiliary heater.

The control system is preferably embodied in such a way that the HVA heating source is activated if the auxiliary heating mode or the HVA heating mode or both are active. Additionally, the HVA heating source is closed-loop controlled with a heating closed-loop controller which uses a heating capacity of the HVA heating source as a manipulated variable and to which a coolant actual temperature of the coolant upstream of the high-voltage accumulator is fed as a closed-loop control variable, and a corresponding coolant set point temperature is fed as a guide variable.

When the auxiliary heating mode and the HVA heating mode are activated simultaneously, a correspondingly high heating demand arises in the HVA circuit, which demand is satisfied to an optimum extent by the described closed-loop control of the HVA heating source. The extraction of heat for heating the passenger compartment occurs in accordance with the heating deficit which results from the fact that the auxiliary heater in the heating circuit is not sufficient for the heating request. The heating closed-loop controller then ensures that the necessary extraction of heat for heating the passenger compartment takes place and, on the other hand, the extraction of heat from the HVA circuit is limited so that the high-voltage accumulator is heated sufficiently. The limitation of the extraction of heat then ensures that the heating of the high-voltage accumulator is ultimately prioritized over the heating of the passenger compartment, i.e. when there is overall insufficient capacity of the auxiliary heater and of the HVA heating source.

The heating of the passenger compartment by means of the heat pump with the heat from the surroundings and the HVA heating mode particularly exclude one another, i.e. when the HVA heating mode and the air-conditioning heating mode are activated at the same time the heat for heating the passenger compartment is generated by means of the auxiliary heater in the heating circuit or the auxiliary heating mode is activated and as a result, if appropriate, heat is transferred from the HVA heating source into the heating circuit by means of the heat pump in addition to the auxiliary heater. If the HVA heating mode is active but the air-conditioning heating mode is not, the chiller is shut off, in particular on the coolant side, by closing the expansion valve in order to avoid losing any heat from the HVA circuit via the heat pump.

After deactivation of the HVA heating mode or of the auxiliary heating mode or of both, there is usually still residual heat available in the HVA circuit, which residual heat results from a temperature spread between the coolant in the HVA circuit and the cell temperature of the high-voltage accumulator. The coolant is warmer here than the high-voltage accumulator and the difference is advantageously available as residual heat for heating the passenger compartment. Therefore, before the heat is taken up again from the surroundings or waste heat from other components in the cooling circuit in the air-conditioning heating mode, the specified residual heat is therefore firstly expediently transferred into the heating circuit by means of the heat pump. In one expedient refinement, the control unit is embodied for this purpose in such a way that in the air-conditioning heating mode, and when the auxiliary heating mode is inactive, the heat pump is activated for heating the passenger compartment and extracts residual heat from the coolant in the HVA circuit, wherein the residual heat arises as excess heat in the HVA circuit by virtue of the fact that the coolant actual temperature upstream of the high-voltage accumulator is higher than a cell temperature of the high-voltage accumulator.

Where the heat in the HVA circuit originates from in the auxiliary heating mode is in the first instance in itself of secondary importance. However, it is relevant that the heat passes into the HVA circuit in order to arrive at the chiller there and to be transferred by means of the heat pump. The heat is either generated directly in the HVA circuit or transferred from the cooling circuit into the HVA circuit by means of the coolant. In the latter case, the heating system is switched over by the control system for the auxiliary heating mode and, in particular, also for the HVA heating mode by means of suitable actuators in such a way that a partial section of the cooling circuit in which the HVA heating source is located is connected to the HVA circuit so that the latter is expanded and an expanded HVA circuit is formed in which the HVA heating source is arranged upstream of the chiller.

In one preferred refinement, the heat source is an HVA auxiliary heater which is preferably connected to the HVA circuit, i.e. in the active state generates heat directly in the HVA circuit. The HVA auxiliary heater is preferably embodied as an electric continuous flow heater, in particular similarly to the auxiliary heater in the heating circuit. In the auxiliary heating mode, the HVA auxiliary heater is then activated by the control system in order to generate heat for heating the passenger compartment. In this context, the closed-loop controllers described above are preferably used so that the HVA auxiliary heater automatically generates the heating capacity required for the high-voltage accumulator or the passenger compartment or for both at the same time. The HVA auxiliary heater has, for example, a heating capacity in the range from 4 kW to 5 kW. However, such a configuration is not absolutely necessary and the HVA auxiliary heater is dimensioned differently in one variant, in particular in accordance with the configuration of the high-voltage accumulator.

Alternatively or additionally, in one advantageous refinement a trimmed electric machine of the vehicle is used as an HVA heating source. The electric machine serves to drive the vehicle and is supplied for this purpose with electrical energy by the high-voltage accumulator. The electric machine is connected to the cooling circuit of the heating system. By trimming the electric machine is operated in a selectively inefficient fashion and as a result generates waste heat which is then used for heating.

Overall, the behavior of the control system and therefore also of the heating system is decisively determined by the temperature-control requirements, which result, for example, from a specific user input via an operator control element of the control system or which take into account ambient conditions which are determined by means of suitable sensors of the control system. Alternatively or additionally, a temperature-control requirement of the control system is determined by a superordinate master control system, for example air-conditioning logic.

The control system is connected, in particular, to the heating system in order to control said heating system. This is understood as meaning, in particular, that the control system manipulates and sets the heating system by means of a number of actuators. In addition, the term "control system" is also understood to mean a closed-loop control system or open-loop control system and closed-loop control system, i.e. the control system is not exclusively configured for open-loop control but rather, if appropriate, also for closed-loop control. The control system suitably has control electronics or a controller in order, in particular, to carry out one or more of the abovementioned settings, open-loop control processes, closed-loop control processors, calculations and/or other operations.

In the open-loop and closed-loop control concepts described above for the various components particular importance is placed on the various characteristic diagrams by means of which, on the one hand, further parameters for the respective open-loop control or closed-loop control are determined and, on the other hand, a reference is made to the various control variables. The characteristic diagrams are determined, in particular, by means of suitable trials and are suitably stored as a value table or a calculation rule in a memory of the control system.

In the method for operating a heating system of an electric vehicle or hybrid vehicle, the heating system is controlled as described above by means of a control system. The object is, in particular, also achieved by means of an electric vehicle or hybrid vehicle having a control system as described above. The object is also achieved more particularly by the use of a control system as described in an electric vehicle or hybrid vehicle. An electric vehicle or hybrid vehicle is distinguished by the fact that in said vehicle the high-voltage accumulator is used for providing drive. The high-voltage accumulator is also referred to as an energy store or as a battery.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
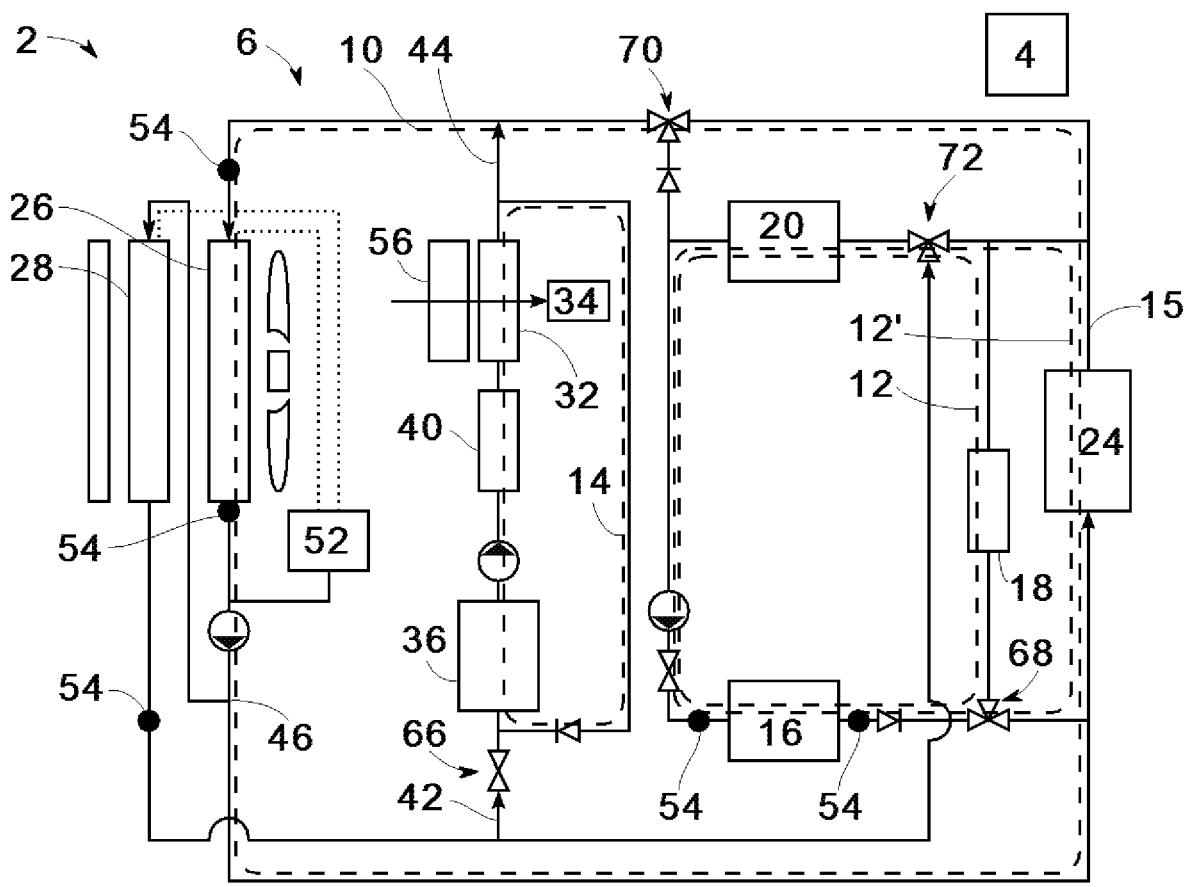
FIG. 1 is a schematic diagram of a heating system and a control system.
Figure 2:
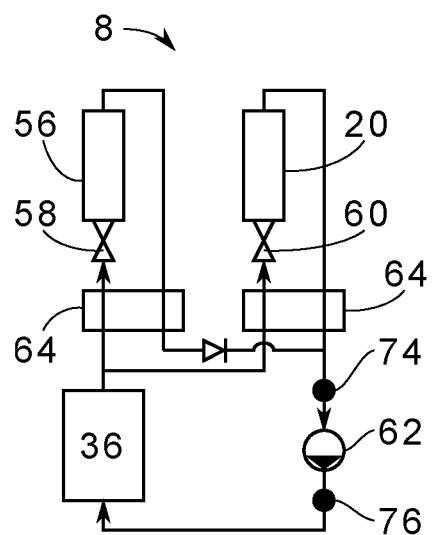
FIG. 2 shows a refrigeration circuit of the heating system.
Figure 3:
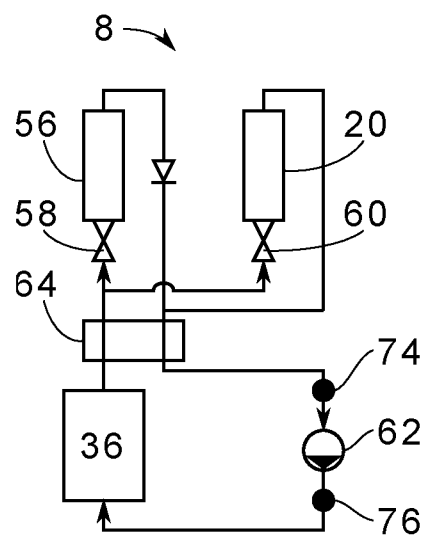
FIG. 3 shows a variant of the refrigeration circuit.

FIG. 1 shows a heating system 2 and a control system 4 for controlling various components of the heating system 2. The heating system 2 is designed for use in an electric vehicle or hybrid vehicle (not shown in more detail). The heating system 2 has an overall cooling circuit 6 as well as a refrigeration circuit 8 (not illustrated in FIG. 1) but for which two variants are shown in FIGS. 2 and 3. The heating system 2 in FIG. 1 constitutes a preferred embodiment, and the aspects which are described below, specifically with respect to the wiring of two respective components with respect to one another in each case, can, however, also be applied individually.

The overall cooling circuit 6 has a plurality of circuits 10, 12, 12', 14, specifically a cooling circuit 10, an HVA circuit 12 and a heating circuit 14. In addition, by correspondingly switching over the heating system 2 an expanded HVA circuit 12' can be formed which is a combination of the HVA circuit 12 with a partial section 15 of the heating circuit 10. The circuits 10, 12, 12' and 14 are indicated in FIG. 1 by dashed lines. A high-voltage accumulator 16 is connected to the HVA circuit 12 in order to supply an electric drive of the vehicle, and also an HVA heating source 18, which is an HVA auxiliary heater here and is embodied as an electric continuous flow heater. Furthermore, a chiller 20 is connected to the HVA circuit 12 and is also connected to the refrigeration circuit 8. A vehicle component 24 of the vehicle, for example an electric machine of the vehicle or a power electronic system and generally a heat source, is connected to the cooling circuit 10, at the partial section 15. In order to exchange heat with the surroundings, a first surroundings cooler 26 is also connected to the cooling circuit 8, which surroundings cooler 26 is combined here with a second surroundings cooler 28 to form a cooler package. However, a configuration without the second surroundings cooler 28 is basically also possible.

A heating-type heat exchanger 32 is connected to the heating circuit 14 in order to heat a passenger compartment 34 of the vehicle. Furthermore, a condenser 36 is connected to the heating circuit 14 and is also connected to the refrigeration circuit 8, and forms together with the chiller 20 a heat pump 20, 36 which transfers heat from the HVA circuit 12 into the heating circuit 14. Arranged in the heating circuit 14 is also an auxiliary heater 40, which is embodied here as an electric continuous flow heater. The heating circuit 14 is connected to the cooling circuit 10 via a heating circuit feed line 42 and a heating circuit return line 44. The HVA circuit 12 is also connected to the cooling circuit 8, but not to the heating circuit 14. Specifically in the wiring shown, by correspondingly switching over the heating system 2 it is optionally possible to bring about a series connection or a parallel connection of the high voltage accumulator 16 and of the vehicle component 24 as well as the setting of the expanded HVA circuit 12'.

An air-conditioning evaporator 56 is connected to the refrigeration circuit 8 in order to cool the passenger compartment 34. In order to set the cooling capacity of the air-conditioning evaporator 56 an expansion valve 58 is connected upstream of it. An expansion valve 60 is also connected upstream of the chiller 20. Furthermore, a compressor 62, as well as one or two internal heat exchangers 64, are arranged in the refrigeration circuit 8. In a variant which is not shown there is no internal heat exchanger 64 present.

The heating system 2 also has a compensation volume 52 for the coolant. Furthermore, temperature sensors 54 are connected at various locations in the overall cooling circuit 2, for measuring the temperature of the coolant. In order to switch over the heating system 2 between the various switched states and in order to set various operating modes, various actuators, here valves 66, 68, 70, 72, are arranged in the overall cooling circuit 4. Furthermore, three 3/2-way valves 68, 70, 72 are arranged, which, depending on the switched position, permit various series connections and parallel connections of the first surroundings cooler 26, chiller 20, component 24 and high voltage accumulator 16. The heating circuit 14 can be respectively shut off independently thereof by means of the shut-off valve 66.

In the case of a heating request for the high-voltage accumulator 16, a HVA heating mode is activated in which the high-voltage accumulator 16 is heated by means of the HVA heating source 18, which for this purpose is activated so that heat is generated in the HVA circuit 12. The HVA heating source 18 is either connected directly to the HVA circuit 12 as shown in FIG. 1, or in a variant which is not shown is connected to the cooling circuit 10 and in the expanded HVA circuit 12'. In the case of a heating request for the passenger compartment 34, an air-conditioning heating mode is correspondingly activated in which the passenger compartment 34 is heated by means of the heating circuit 14. This heat is generated with the auxiliary heater 40 or transferred into the heating circuit 14 with the heat pump 20, 36. If the heat pump 20, 36 is used, it extracts heat from the surroundings by means of the surroundings cooler 26 or transfers waste heat from the vehicle component 24 or the high-voltage accumulator 16 into the heating circuit 14.

In the air-conditioning heating mode, the heat of the auxiliary heater 40 and of the heat pump 20, 36 is under certain circumstances not sufficient. Therefore, when the air-conditioning heating mode is activated it is determined whether there is a heating deficit which indicates whether or not the heating request can be satisfied completely with the auxiliary heater 40 or with the heat pump 20, 36 or with both. If there is actually a heating deficit, an auxiliary heating mode is activated in which firstly the HVA heating source 18 is activated insofar as it is not already active in any case owing to the HVA heating mode. In the auxiliary heating mode, heat from the HVA heating source 18 is then transferred from the HVA circuit 12 into the heating circuit 14 by means of the heat pump 20, 36 in order to compensate the heating deficit.

It is basically possible to determine, in different ways, whether there is a heating deficit. For example, the control system 4 is for this purpose embodied in such a way that it is determined that there is a heating deficit if a difference between a heating circuit actual temperature T-HK-I in the heating circuit 14 and a heating circuit set point temperature T-HK-S exceeds a maximum difference. Alternatively it is determined that there is a heating deficit if a difference between a set point heating capacity and a potential heating capacity exceeds a maximum difference, wherein the set point heating capacity is determined on the basis of the heating request, and the potential heating capacity is determined on the basis of a respective maximum heating capacity of the auxiliary heater 40 and of the heat pump 20, 36. In addition, the auxiliary heating mode is activated here in a delayed fashion in that when there is a heating deficit the auxiliary heating mode is not actually activated until a waiting time has elapsed before.

Figure 4:
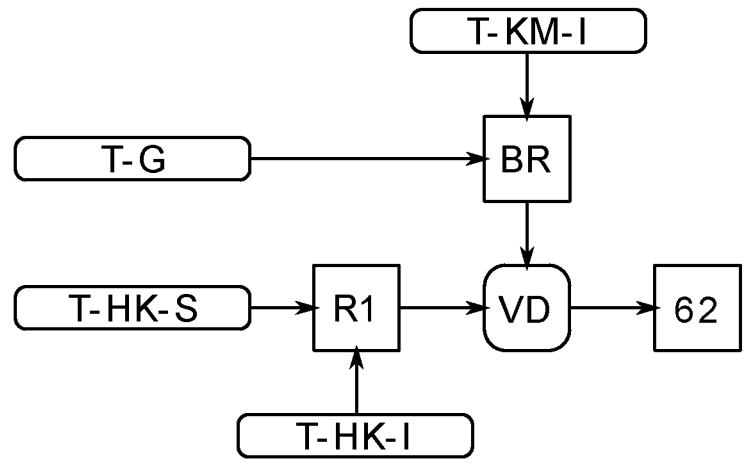
FIG. 4 shows a closed-loop control concept for a compressor of the heating system.
Figure 5:
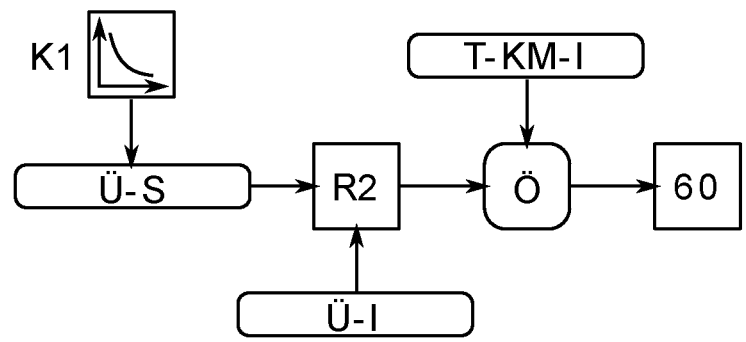
FIG. 5 shows a closed-loop control concept for an expansion valve of the heating system.

The quantity of heat which is transferred from the heat pump 20, 36 into the heating circuit 14 is the sum of the drive power of the compressor 62 and the refrigeration capacity of the chiller 20. The compressor 62 is operated at a specific compressor rotational speed VD which is suitably set in order to set a specific heating capacity of the refrigeration circuit 8. In this context, a specific refrigeration capacity is implemented at the chiller. In addition, a specific opening Ö is set for the expansion valve 60 in order to influence the refrigeration capacity of the chiller 20. FIGS. 4 and 5 respectively illustrate a closed-loop control concept for the compressor 62 and the expansion valve 60, respectively.

The capacity of the refrigeration circuit 8 is closed-loop controlled here with a compressor closed-loop controller R1 as shown in FIG. 4. The compressor closed-loop controller R1 uses the compressor rotational speed VD as a manipulated variable, while the particular heating circuit actual temperature T-HK-I in the heating circuit 14 is fed in as a closed-loop control variable and the heating circuit set point temperature T-HK-S, which is predefined e.g. by air-conditioning functional logic, is fed in as a guide variable. In this context, the compressor closed-loop controller R1 is used irrespective of whether or not the auxiliary heating mode is activated in the air-conditioning heating mode. The greater the difference between the heating circuit actual temperature T-HK-I and the heating circuit set point temperature T-HK-S, the higher the setting of the compressor rotational speed VD, and the greater the amount of heating capacity which is generated by the refrigeration circuit 8 overall.

Insofar as the HVA heating mode is also active at the same time as the auxiliary heating mode, the heat pump 20, 36 and the high-voltage accumulator 16 are in competition with respect to the heat in the HVA circuit 12. Therefore, the compressor closed-loop controller R1 in FIG. 4 is limited in the auxiliary heating mode. For this purpose, the control system 4 has a limiting closed-loop controller BR which limits the compressor rotational speed VD, specifically in accordance with the coolant actual temperature T-KM-I.

FIG. 5 clarifies how the capacity of the heat pump 20, 36 is closed-loop controlled when the air-conditioning heating mode is active. In this context, the expansion valve 60 is closed-loop controlled with a valve closed-loop controller R2 which uses the opening Ö of the expansion valve 60 as a manipulated variable and to which an actual overheating value Ü-I in the refrigeration circuit 8 is fed as a closed-loop control variable and a set point overheating value Ü-S is fed as a guide variable. In this context, the valve closed-loop controller R2 is also used irrespective of whether or not the auxiliary heating mode is activated in the air-conditioning heating mode.

In a way which is analogous to the compressor closed-loop controller R1, the valve closed-loop controller R2 is limited in order to limit the extraction of heat from the HVA circuit 12, specifically when the HVA heating mode is active at the same time. Generally, in this context the refrigeration capacity of the chiller 20 is limited in the auxiliary heating mode. This is achieved in a first variant in that the set point overheating value Ü-S is obtained from a characteristic diagram K1 in accordance with the coolant actual temperature T-KM-I in the HVA circuit 12 downstream of the chiller 20. In another variant, as the coolant actual temperature T-KM-I rises, the opening Ö of the expansion valve 60 reduces. Both variants are shown at the same time in FIG. 5.

Figure 6:
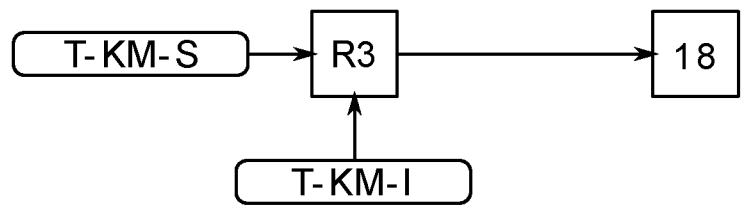
FIG. 6 shows a closed-loop control concept for an HVA heating source of the heating system.

The HVA heating source 18 is activated here if the auxiliary heating mode or the HVA heating mode or both are active. In addition, the HVA heating source 18 is, as shown in FIG. 6, closed-loop controlled with a heating closed-loop controller R3 which uses a heating capacity of the HVA heating source 18 as a manipulated variable and to which the coolant actual temperature T-KM-I is fed as a closed-loop control variable and a corresponding coolant set point temperature T-KM-S is fed as a guide variable.

When the auxiliary heating mode and the HVA heating mode are activated simultaneously, a correspondingly high heating demand occurs in the HVA circuit, which demand is automatically satisfied in an optimum way by the described closed-loop control of the HVA heating source 18 in conjunction with the two closed-loop controllers for the compressor 62 and the expansion valve 60. The extraction of heat for heating the passenger compartment occurs in accordance with the heating deficit which results from the fact that the auxiliary heater 40 in the heating circuit 14 is not sufficient for the heating request. The heating closed-loop controller R3 then ensures that the HVA heating source 18 provides additional heat depending on demand, in order, on the one hand, to ensure the necessary extraction of heat for heating the passenger compartment and, on the other hand, to ensure the heating of the high-voltage accumulator 16. The limitation of the extraction of heat then ensures that the heating of the high-voltage accumulator 16 is ultimately prioritized over the heating of the passenger compartment.

After the HVA heating mode has been deactivated, there is usually still residual heat available in the HVA circuit 12, which residual heat results from a temperature spread between the coolant in the HVA circuit 12 and the cell temperature of the high-voltage accumulator 16. Before the auxiliary heating mode is additionally activated in the air-conditioning heating mode, the specified residual heat is firstly transferred into the heating circuit 14 by means of the heat pump 20, 36.

LIST OF REFERENCE SYMBOLS

2 Heating system
4 Control system
6 Overall cooling circuit
8 Refrigeration circuit
10 Cooling circuit
12 HVA circuit
12' Expanded HVA circuit
14 Heating circuit
15 Partial section
16 High-voltage accumulator
18 HVA heating source
20 Chiller
24 Component
26 First surroundings cooler
28 Second surroundings cooler
32 Heating-type heat exchanger
34 Passenger compartment
36 Condenser
40 Auxiliary heater
42 Heating circuit feed line
44 Heating circuit return line
52 Compensation volume
54 Temperature sensor
56 Air-conditioning evaporator
58 Expansion valve (of the air-conditioning evaporator)
60 Expansion valve (of the chiller)
62 Compressor 64 Internal heat exchanger
66 Shut-off valve
68 3/2-way valve
70 3/2-way valve
72 3/2-way valve
BR Limiting closed-loop controller
Ö Opening
K1 Characteristic diagram
R1 Compressor closed-loop controller
R2 Valve closed-loop controller
R3 Heating closed-loop controller
T-G Limiting temperature
T-HK-I Actual heating circuit temperature
T-HK-S Set point heating circuit temperature
T-KM-I Coolant actual temperature
T=KM-S Coolant set point temperature
VD Compressor rotational speed
Ü-I Actual overheating value
Ü-S Set point overheating value The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A system for a heating system of an electric vehicle or hybrid vehicle, comprising:
   a control system configured to execute a process such that:
      when there is a heating request for a high-voltage accumulator (HVA), an HVA heating mode is activated in which the high-voltage accumulator, which is connected to an HVA circuit of the heating system, is heated by an HVA heating source which is activated for said purpose so that heat is generated in the HVA circuit or transferred into said HVA circuit,
      when there is a heating request for a passenger compartment of the vehicle, an air-conditioning heating mode is activated in which the passenger compartment is heated, by a heating circuit, with heat which is generated with an auxiliary heater in the heating circuit or is transferred into the heating circuit with a heat pump, or both,
      when an air-conditioning heating mode is activated, determining whether there is a heating deficit which indicates whether or not the heating request can be satisfied completely with the auxiliary heater or with the heat pump or with both,
      if there is a heating deficit, an auxiliary heating mode is activated in which heat of the HVA heating source is transferred from the HVA circuit into the heating circuit by the heat pump in order to compensate the heating deficit.

2. The system according to claim 1, wherein the control system is further configured such that:
   it is determined that there is a heating deficit if a difference between a heating circuit actual temperature in the heating circuit and a heating circuit set point temperature exceeds a maximum difference.

3. The system according to claim 1, wherein the control system is further configured such that:
   it is determined that there is a heating deficit if a difference between a set point heating capacity and a potential heating capacity exceeds a maximum difference, wherein the set point heating capacity is determined on the basis of the heating request, and the potential heating capacity is determined on the basis of a respective maximum heating capacity of the auxiliary heater and of the heat pump.

4. The system according to claim 1, wherein the control system is further configured such that:
   the auxiliary heating mode is activated in a delayed fashion, wherein when there is a heating deficit the auxiliary heating mode is not activated until a waiting time has elapsed.

5. The system according to claim 1, wherein the control system is further configured such that:
   the capacity of a refrigeration circuit of the heating system is closed-loop controlled with a compressor closed-loop controller which uses as a manipulated variable a compressor rotational speed of a compressor in the refrigeration circuit and to which a heating circuit actual temperature of the coolant in the heating circuit is fed as a closed-loop control variable and a heating circuit set point temperature is fed as a guide variable, and the compressor closed-loop controller is used irrespective of whether or not the auxiliary heating mode is activated in the air-conditioning heating mode.

6. The system according to claim 5, wherein the control system is further configured such that:
   the compressor closed-loop controller is limited in the auxiliary heating mode in that the compressor rotational speed of the compressor is limited in accordance with a coolant actual temperature in the HVA circuit downstream of the chiller so that the refrigeration capacity of the chiller is limited.

7. The system according to claim 1, wherein the control system is further configured such that:
   an expansion valve is closed-loop controlled with a valve closed-loop controller which uses as a manipulated variable an opening of the expansion valve upstream of a chiller of the heat pump in a refrigeration circuit of the heat system and to which an actual overheating value in the refrigeration circuit is fed as a closed-loop control variable, and a set point overheating value is fed as a guide variable, and that the valve closed-loop controller is used irrespective of whether or not the auxiliary heating mode is activated in the air-conditioning heating mode.

8. The system according to claim 7, wherein the control system is further configured such that:
   the refrigeration capacity of the chiller is limited in the auxiliary heating mode in that the set point overheating value is extracted from a characteristic diagram in accordance with a coolant actual temperature in the HVA circuit downstream of the chiller.

9. The system according to claim 7, wherein the control system is further configured such that:
   the refrigeration capacity of the chiller is limited in the auxiliary heating mode in that the opening of the expansion valve is reduced as the coolant actual temperature in the HVA circuit downstream of the chiller rises.

10. The system according to claim 1, wherein the control system is further configured such that:
    when the auxiliary heating mode and the HVA heating mode are activated simultaneously, the heat pump is actuated in such a way that its efficiency is set in such a way that the extraction of heat from the HVA circuit is limited and the heating deficit is nevertheless compensated.

11. The system according to claim 1, wherein the control system is further configured such that:

the HVA heating source is activated if the auxiliary heating mode or the HVA heating mode is active or both are active, and is closed-loop controlled with a heating closed-loop controller to which a heating capacity of the HVA heating source is fed as a manipulated variable and to which a coolant actual temperature in the HVA circuit upstream of the high-voltage accumulator is fed as a closed-loop control variable, and a coolant set point temperature is fed as a guide variable.

12. The system according to claim 1, wherein the control system is further configured such that:

in the air-conditioning heating mode and when the auxiliary heating mode is inactive, the heat pump is activated in order to heat the passenger compartment, and residual heat is extracted from the coolant in the HVA circuit, wherein the residual heat occurs as excess heat in the HVA circuit as a result of the fact that the coolant actual temperature upstream of the high-voltage accumulator is higher than a cell temperature of the high-voltage accumulator.

13. The system according to claim 1, wherein the HVA heating source is an HVA auxiliary heater which is connected to the HVA circuit downstream of the heat pump.

14. The system according to claim 13, wherein the HVA auxiliary heater is an electric continuous flow heater.

15. The system according to claim 1, wherein the HVA heating source is a trimmed electric machine of the vehicle.

16. A method for operating a heating system of an electric vehicle or hybrid vehicle via a control system, the method comprising:

when there is a heating request for a high-voltage accumulator (HVA), activating an HVA heating mode in which the high-voltage accumulator which is connected to an HVA circuit of the heating system is heated by an HVA heating source which is activated for this purpose so that heat is generated in the HVA circuit or is transferred into said circuit, when there is a heating request for a passenger compartment of the vehicle, activating an air-conditioning heating mode in which the passenger compartment is heated by a heating circuit, with heat which is generated with an auxiliary heater in the heating circuit, or is transferred into the heating circuit with a heat pump, or both, when the air-conditioning heating mode is activated, determining whether there is a heating deficit which indicates whether or not the heating request can be satisfied completely with the auxiliary heater or with the heat pump, or both, if there is a heating deficit, activating an auxiliary heating mode in which heat of the HVA heating source is transferred from the HVA circuit into the heating circuit by the heat pump in order to compensate the heating deficit.

* * * * *